United States Patent [19]

Swann

[11] Patent Number: 4,626,024
[45] Date of Patent: Dec. 2, 1986

[54] PICKUP VAN

[76] Inventor: Jack D. Swann, 3668 Cascade Palmetto Hwy., Atlanta, Ga. 30331

[21] Appl. No.: 752,123

[22] Filed: Jul. 5, 1985

[51] Int. Cl.[4] .............................................. B60J 7/02
[52] U.S. Cl. ..................................... 296/216; 296/219
[58] Field of Search ...................... 296/216, 219, 99 R, 296/99 A

[56] References Cited

U.S. PATENT DOCUMENTS 2,469,159  5/1949  Dombrowiak ...................... 296/216
4,272,121  6/1981  Kim .................................... 296/216
4,355,916  6/1982  Gutgsell ............................. 296/216

Primary Examiner—Robert B. Reeves
Assistant Examiner—Carol L. Olson
Attorney, Agent, or Firm—Thomas & Kennedy

[57] ABSTRACT

A truck is convertible between configurations as a panel truck and a pickup truck. It has a movable body section adapted to be positioned so as to shelter a rear portion of the truck cargo bay and so as to expose the rear portion to ambience. A fixed body section that shelters a forward portion of the cargo bay has a track mounted upon its top. The movable section has pivotable runners guided on the track.

7 Claims, 4 Drawing Figures

PICKUP VAN

TECHNICAL FIELD

This invention relates to automotive vehicles of the type used in carrying light loads of cargo such as panel trucks and pickup trucks.

BACKGROUND OF THE INVENTION

Today, light-weight cargo loads are typically transported in pickup trucks and in panel trucks, which often are referred to as vans. Pickup trucks have an enclosed cab in which a driver and passengers may be seated side-by-side. An open top, cargo bay bed extends rearwardly from the cab. This bed is partially bordered by two sides and a tailgate. Panel trucks or vans, on the other hand, have their cargo bays completely enclosed. Thus, they have fixed sides and a top that coextend from those of the cab. The rear ends of their cargo bays are typically closed by doors.

Each of the just described types of motor vehicles has its own attributes and its own limitations. Pickup trucks are quite versatile in their ability to carry loads of varying configurations which may protrude above the height of the cab and from the rear of the truck with the tailgate either in an upright or horizontal position. Since their cargo spaces or bays are open to ambience, they may be readily loaded and unloaded from both sides and from the rear of the truck. Panel trucks, however, have the attribute of a completely closed cargo bay which provides security, privacy and shelter from adverse weather. On the other hand, they may not be loaded as readily or carry loads that are larger than their carbo bays.

Since both pickup trucks and vans have their own attributes, which heretofore have often been mutually exclusive, it would be advantageous to devise a truck which possesses the attributes of both. Accordingly, it is to the provision of such a vehicle, which herein is termed a "pickup van", that the present invention is primarily directed.

SUMMARY OF THE INVENTION

In one form of the invention, a pickup van has a cab and a body sheltering a cargo bay with the body segmented into a fixed body section that shelters a forward portion of the cargo bay located adjacent the cab, and a movable body section. A track is mounted on the fixed body section. Runners are pivotably mounted to the movable body section for movement along the track. So constructed, the pickup van may be configured as a van with the fixed and movable body sections jointly sheltering the entire cargo bay, and configured as a pickup truck with the movable body section positioned above the fixed body section.

In another form of the invention, a convertible truck has a cargo bay sheltered by two sides and a top segmented into forward and rearward sections. The truck has guide means for guiding the rearward section between a rear position atop the walls of the forward section sheltering a rear portion of the cargo bay, and a forward position upon the top of the forward section exposing the cargo bay rear portion to ambience. So constructed, the truck may be converted between a panel type truck and a pickup type truck by positionings of the rearward section with respect to the forward section.

In yet another form of the invention, a truck convertible between the configuration of a panel truck and the configuration of a pickup truck comprises a fixed body section having two sides joined by a top that shelters the forward portion of a cargo bay. The truck also has a movable body section which has two sides joined by a top. Guide means are provided for guiding the movable body section between a rear position with the movable body section top sheltering a rear portion of the cargo bay and a forward position with the movable body section top positioned above the fixed body section top exposing the cargo bay rear portion to ambience.

DETAILED DESCRIPTION

Figure 1:
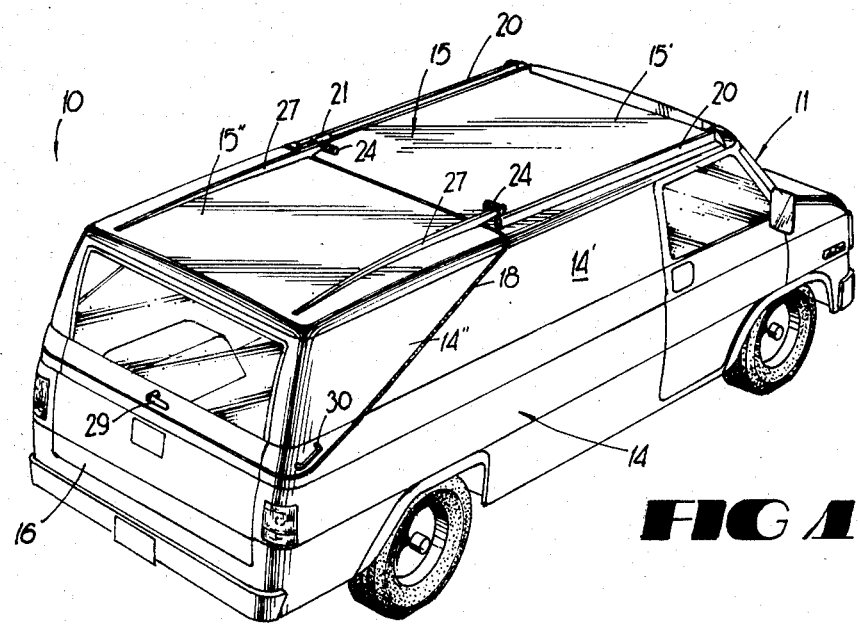
FIG. 1 is a perspective view of a pickup van embodying principles of the present invention configured as a conventional van.

With reference next to the drawing, there is shown a pickup van 10 which, with the exception of the improvement of the present invention, is a conventional panel truck or a van having a cab 11 and a cargo bay 12 just to the rear of the cab. The pickup van has a body which includes two opposite sides, indicated generally at 14, and a top, indicated generally at 15. A tailgate 16 is pivotably mounted to the rear end of the van.

As shown in the drawing, the body is segmented into a fixed section and a movable section. The fixed section includes two side walls 14' and a top 15'. The movable body section includes side walls 14" and a top 15". Resilient seals 18 line the mating edges of the two body sections to provide a tight seal when the movable section is positioned as shown in FIG. 1 to close the cargo bay.

Figure 2:
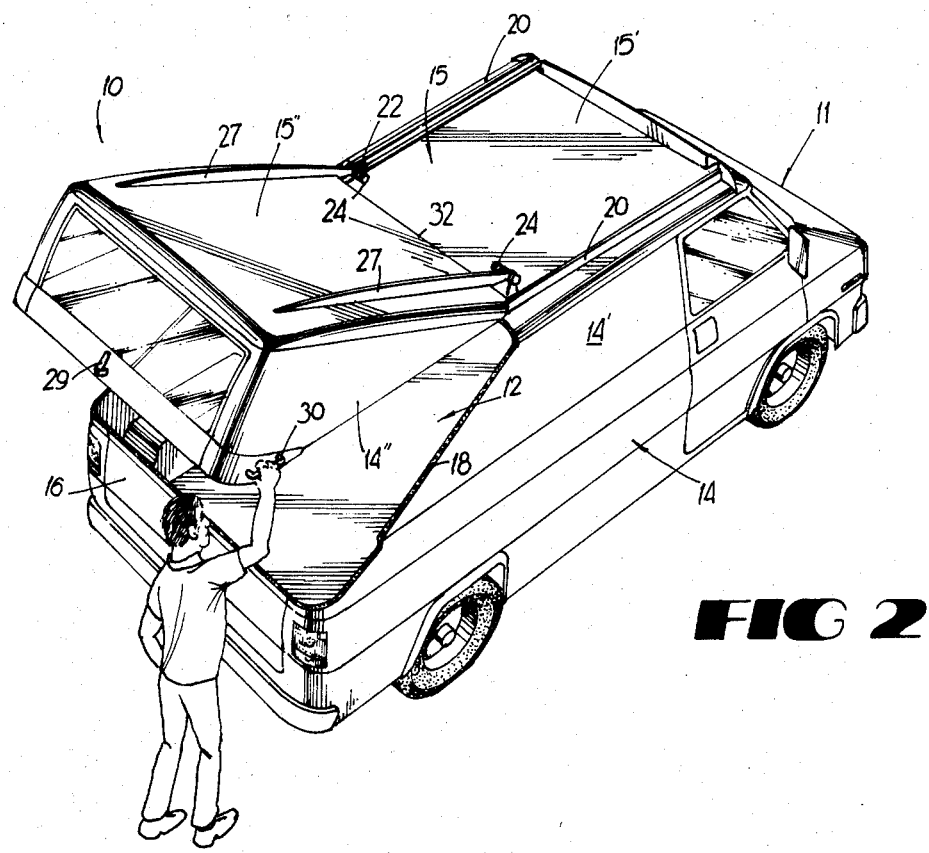
FIG. 2 is a perspective view of the pickup van illustrated in FIG. 1 with a body section being elevated preparatory to conversion to a pickup truck configuration.
Figure 3:
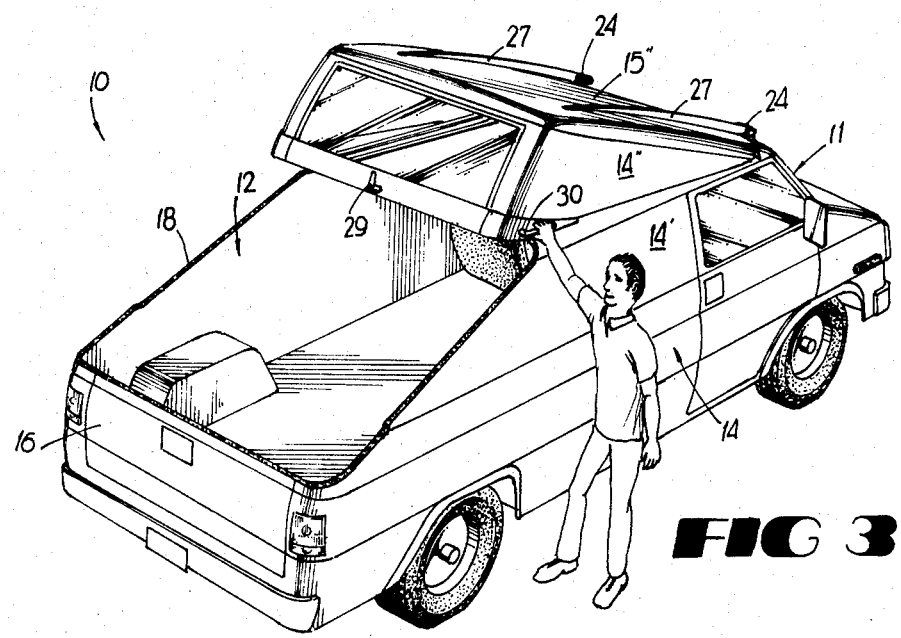
FIG. 3 is another perspective view of the pickup van with a body section shown positioned to expose a rear portion of the van cargo bay, and thereby reconfiguring the vehicle as a pickup truck.
Figure 4:
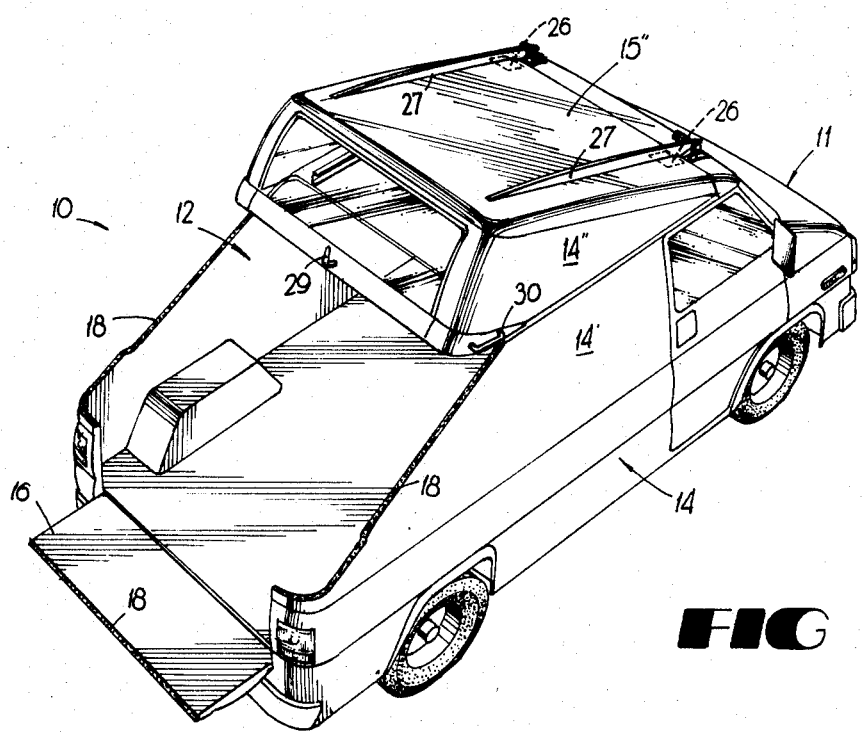
FIG. 4 is another perspective view of the pickup van configured as a pickup truck with the tailgate lowered.

The pickup van is further seen to include guide means for guiding the movable section between the position closing the cargo bay, as shown in FIG. 1, and the positions opening the cargo bay and configuring the vehicle as a conventional pickup truck, as shown in FIGS. 3 and 4. This guide means include a track having a pair of rails 20 mounted in mutual parallel relation fore and aft upon the top 15' of the fixed body section and the cab top. These rails are provided by U-shaped channels with stops mounted at each end of the channels. The guide means also include runners mounted for reciprocal movement along the track. In FIG. 1 a runner 21 is seen to be in the shape of an elongated bar mounted for sliding movement within the channel type rails 20. Alternatively, in FIG. 2 the runners 22 comprise rollers or casters which are mounted for rolling movement within the guide rails.

In either configuration the runners are pivotably mounted to the movable body section to enable the body section to be pivoted while the runners stay captured within the rails. The pivotable means preferably includes torsion bars 24 which spring bias the movable body section in a clockwise direction, as viewed from the right hand side of the vehicle as shown in the drawing. In this manner the torsion bars provide an assist in manually raising the rear end of the movable section as demonstrated in FIG. 2. This force applied to the rear section, however, is not such as to raise the movable section without some manual assist. As shown in FIG. 4, a pair of bearing plates 26 is mounted to the bottom of the movable section top adjacent a pair of struts 27. These struts are rigidly mounted to the top of the movable section top 15" and coupled with the torsion bars 24. A rotatable lock handle 29 is centrally mounted to the rear of the movable body section while a pair of grab handles 30 is mounted to the rearward portion of the sides 14" of the movable section.

The pickup van may be configured as a conventional van with the movable section positioned as shown in FIG. 1 enclosing a rear portion of the cargo bay 12. In this configuration it is seen that the vehicle looks like a conventional van except for the seam that extends along a downward slope from front to rear along the vehicle body sides 14 and the continuation of this seam along the top of the vehicle. In this configuration a cargo housed within the cargo bay is secure and completely sheltered. The pickup van, however, may be converted to a configuration similar to that of a conventional pickup truck having a cargo bay exposed to ambience. This may be desired merely for loading and unloading purposes. However, it may be also desired for transport as where a large or oddly shaped load is to be carried.

To convert the vehicle to a pickup truck configuration the lock handle 29 is rotated to an unlocked position thereby releasing the movable body section. The rear of the movable section is then lifted as by raising the grab handles 30 as shown in FIG. 2. As the rear of the movable section is lifted it pivots upon the torsion bars. Once the movable section has been tilted so as to bring it to a position with its leading edge 32 located above the tracks provided by rails 20, the movable section is pushed forward bringing the bearing plates 26 into sliding engagement atop the tracks. The movable body section may then be pushed to a position overlaying the top 15' of the fixed body section, as shown in FIG. 3. As this is done the runners, whether they be of sliding or rotatable types, travel along the track while the bearing plates support the movable section. Alternatively, it may be held aloft such as where two people are present to lift each side. Once the movable section has been moved forward, the tailgate may be lowered as shown in FIG. 4 to facilitate loading and unloading operations as from a relatively low loading dock. For a higher loading dock the tailgate may be left up as shown in FIG. 3.

If desired, the van may be driven in the pickup truck orientation whereupon the sloping top 15" of the movable section provides a windshield or baffle for the flow of air over the truck thereby further sheltering cargo housed within the cargo bay 12. The truck may be equipped with a holddown device for preventing the movable section from bouncing as the truck is being driven. Preferably, this is provided by stops adjacent the torsion bars 24 that limit upward movement of the struts 27.

To return the truck to the van configuration shown in FIG. 1, the procedure is merely reversed. In other words, the movable section is slid rearwardly along the tracks provided by rails 20. Once the forward edge 32 of the movable section has passed beyond the rails and off the bearing plates, the movable section is rotated downwardly whereupon its walls and rear end engage the lining upon the upper edge of the movable section. The unshown stops at the ends of the rails prevent the runners from escaping. The lock handle 29 may then be rotated back to its closed position.

It thus is seen that a convertible vehicle of novel construction is provided that obtains the attributes of both conventional panel trucks and pickup trucks. It should, however, be understood that the just described embodiment merely illustrate principles of the invention in a preferred form. Many modifications, additions and deletions may, of course, be made thereto without departure from the spirit and scope of the invention as set forth in the following claims.

I claim:

1. A convertible truck having a cargo bay sheltered by two sides and a top segmented into forward and rearward sections, and with the truck having guide means for guiding said rearward section between a rear position atop the walls of said forward section sheltering a rear portion of said cargo bay and a forward position atop the top of said forward section exposing said cargo bay rear portion to ambience, said guide means including a pair of rails mounted atop said top forward section and a pair of runners pivotably mounted to a forward end of said top rearward section for movement along said pair of rails, whereby the truck may be converted between a panel type truck and a pickup type truck by repositioning of the top rearward section with respect to the top forward section with the forward end of the rearward section maintained closely adjacent the top of the forward section in the forward position so that air flow over the truck will force the top rearward section in its forward position downwardly upon the rails.

2. The convertible truck of claim 1 wherein each of said runners is comprised of an enlongated bar.

3. The convertible truck of claim 1 including bearing plate means for slidably supporting said rearward section atop said pair of rails.

4. The convertible truck of claim 1 having a cab sheltered by a cab top that unitarily extends from the top of said forward section, and wherein said pair of rails extend atop said cab top.

5. A truck convertible between the configuration of a panel truck and the configuration of a pickup truck, and with said truck comprising, in combination, a fixed body section having two sides joined by a top that shelters a forward portion of a cargo bay, a movable body section having two sides joined by a top, and guide means comprising a pair of rails mounted atop said fixed section top and a pair of runners pivotably mounted to a forward end of said movable section for movement along said rails for guiding said movable body section between a rear position with said movable body section top sheltering a rear portion of said cargo bay in sealing engagement with the fixed body section and a forward position with said movable body section top positioned above said fixed body section top exposing said cargo bay rear portion to ambience, whereby the forward end of the movable body section may be lifted from its sealing engagement with the fixed body section, placed upon the rails, and slid upon the rails to its forward position.

6. The convertible truck of claim 5 wherein said fixed body sides extend rearwardly of said fixed body top.

7. The convertible truck of claim 6 wherein that portion of said fixed body sides that extend rearwardly of said fixed body top has upper edges that slope downwardly as they extend rearwardly, and wherein said movable body sides have lower edges that slope downwardly as they extend rearwardly.

* * * * *